United States Patent

[11] 3,607,304

| [72] | Inventor | Ezra Levin |
| | | 1109 W. University Ave., Champaign, Ill. 61820 |
| [21] | Appl. No. | 702,174 |
| [22] | Filed | Feb. 1, 1968 |
| [45] | Patented | Sept. 21, 1971 |

[54] STABLE DRIED DEFATTED EGG PRODUCT
5 Claims, No Drawings

[52] U.S. Cl. .................................................. 99/113, 99/161, 99/210
[51] Int. Cl. .................................................. A23j 1/08, A23b 5/02
[50] Field of Search ........................................... 99/113, 161, 210

[56] References Cited
UNITED STATES PATENTS

| 2,500,543 | 3/1950 | Hall ............................. | 99/163 X |
| 2,619,425 | 11/1952 | Levin ........................... | 99/208 X |

FOREIGN PATENTS

| 803,071 | 10/1958 | Great Britain ................ | 99/113 |

Primary Examiner—Joseph Scovronek
Assistant Examiner—Warren Bovee
Attorney—Burmeister, Kulie, Southard & Godula ABSTRACT: A stable, dried and defatted egg product which has the improved features of being free of Salmonella infection substantially free of any fat so as to have indefinite shelf life without spoilage. The product has higher protein content and may contain a small amount of an antioxidant in intimate dispersion characterized by a tendency to contact or adhere to the individual particles of the product so as to exert an improved effect. The product is made by removing water and the fat in a body of solvent at moderate temperatures below levels which would tend to cook the raw egg. The water is removed as an azeotropic mixture of solvent and water, and the fat is extracted into the solvent. The solid product is separated from the mixture of solvent and extracted fat, and the remaining solvent is preferably removed by introducing a body of water in the form of particulate droplets while maintaining a moderate temperature level.

STABLE DRIED DEFATTED EGG PRODUCT

This invention relates to an improved dried and defatted egg product of a type which can be subsequently hydrated and cooked. Particularly, the invention relates to a product marked by many improvements including extended shelf life, higher protein content, a substantial absence of cholesterol and no Salmonella contamination.

Dried egg product has been available to the art, and it is principally prepared by the well-known technique of spray drying. Such a method and similar art methods do not remove egg fat or oil to a sufficient degree to retard spoilage upon extended standing.

Oxidation of the fat content produces rancidity in a known manner. In addition to the problem of spoilage, such prior art egg products retain substantially all of the cholesterol originally present in the raw egg. The preponderant medical view is that such cholesterol is contraindicated in the diet, particularly in the presence of cardiac and hypertensive complications. Another problem with the prior art egg product is that any Salmonella infection in the originally fresh egg is retained in the dried product so that the possibility of this serious health hazard continues as an objectionable feature. In general, such art products further have a lower protein content, and this is a shortcoming in view of the high nutritional value of this food component.

This invention has for a primary object the provision of a dry egg product which efficiently eliminates the foregoing problems while still providing a product which is nutritional, easily handled in cooking, and tasteful.

A particularly important object of the invention is to produce an egg product which can be stored for extended or indefinite periods without spoilage.

Another particularly important object is to produce a dried egg product which is free of Salmonella infection.

Still another important object is to produce a dried egg product from which the original cholesterol content has been substantially eliminated.

Yet another important object is to produce a dried egg produce which has higher quantity of good quality protein by weight. Yet another important object of the invention is to produce an egg product which has improved resistance to insect infestation.

A similar important object is to produce an egg product in which small but effective amounts of an antioxidant are in intimate contact with the product so that any trace levels of fat which may be present will not lead to spoilage through oxidation.

Yet another important object of the invention is to produce a method by which an improved egg product of the foregoing type may be prepared by efficient process steps.

An egg product is obtained which meets the foregoing objects as well as having other useful qualities and virtues.

This egg product has substantially all the water and all the fat or oil removed from the whole egg. The egg product may be the preferred mixture of eggs albumin and egg yolk or these components of raw egg may be separately dried and defatted in the improved manner to obtain the improved and separated egg product. Not only is the egg product made with an extremely low fat content to resist subsequent spoilage upon standing, but it has substantially no cholesterol and is free of Salmonella infection. In addition, the egg product has a high quantity of protein, which is high-grade protein as established by a Protein Efficiency Ratio assay. The product of this invention also shows a marked resistance to insect infestation.

The egg product is generally obtained by removing water and fat from whole egg by a low temperature azeotropic distillation of the type disclosed in U.S. Letters Pat. No. 2,503,313 issued to the present applicant. Such a distillation is, in fact, conducted at still lower temperatures than indicated in the foregoing patent. It is required that the distillation temperature not substantially exceed about 100° F. (37° C.) so that no undesired protein coagulation occurs in the processing. In other words, a dried and defatted raw egg product is desired which can be subsequently hydrated and cooked in the usual way. The dehydration and defatting occurs in a fat organic solvent which is capable of forming the desired azeotrope and, at the same time, defatting the raw egg.

It is an important feature of the process of preparing the egg product that the substantial content of solvent remaining in the dried and separated product is removed by introducing water in the form of particulate droplets and applying moderate heat at below about 37° C. The solvent in the dried product is then removed or deabsorbed as a mixture of the solvent and water. The fat organic solvent in the dried product can be effectively removed to only trace levels which are desirably retained with certain fat organic solvents to obtain other advantages, as will be later described. The particulate water droplets need not be of any critical size except that they should be in the small droplet form common to mists or sprays. The purpose is to provide good contact between the water droplets and the solvent in a fine form so that the solvent forms a distillable mixture with the water droplets without the water substantially wetting the body of the dried egg product. It has been found that when introducing water in such a particulate droplet form, the solvent content of the ultimately dried and defatted product can be reduced to below 100 p.p.m., say from about 60 p.p.m. to about 100 p.p.m.

It is preferred to introduce the raw egg into the heated body of fat organic solvent as an intimate mixture of the egg and the same fat organic solvent. In particular, the raw egg is preferably emulsified in a fat organic solvent with the aid of a conventional homogenizer such as that provided by the Cherry Burrell Corporation. Different proportions of egg and fat organic solvents may be used to prepare the emulsified mixture but generally an excess volume of solvent is preferred, such as about four volumes of solvent to about one volume of raw egg. The emulsified egg fat solvent mixture may then be sprayed below the surface of the heated body of fat solvent heated at moderate temperature levels. Practitioners will appreciate that the body of fat organic solvent will be heated at the moderate temperature levels under decreased pressure so that the fat organic solvent boils at the reduced temperature and thereby forms an azeotrope of the water in the raw egg and the fat organic solvent. Pressure levels are applied in pressure vessels in the recognized manner of the art to attain the formation of the azeotrope at its selected and desired temperature level. The emulsified egg and solvent mixture may also be introduced in an atomized form by delivering the emulsified mixture under pressure through spray jets underneath the body of boiling fat solvent.

Various fat organic solvents may be used which can form an azeotrope in water, and many types of such solvents are described in the foregoing U.S. Letters Pat. No. 2,503,313. In general, halogenated hydrocarbons are preferred such as perchlorethylene, trichlorethylene and, particularly, ethylene dichloride. Exceptional individual particle contact is obtained when adding desired materials to the body of boiling fat organic solvent during the azeotropic distillation. It is believed that an intimate mixture is attained which is characterized by close contact or adhesion of the material with the egg product particles. For example, small but effective nontoxic levels of an antioxidant may be added to the boiling fat organic solvent to attain intimate contact of said antioxidant with the individual particles. Such lower levels of antioxidant will more effectively retard oxidation of any trace levels of any fat remaining in the final egg product than if the antioxidant were added after the product were dried and defatted. Such antioxidants may be butylated hydroxy toluene or BHT; butylated hydroxy anisole of BHA; propyl gallate; nordiguaiaretic acid or NDGA; or others.

The following examples are presented merely to illustrate way to practice the invention. Such examples should not be construed, however, as representing the only way in which the improved egg product may be prepared and evaluated.

EXAMPLE 1

Egg Product Preparation by Azeotropic

Distillation with Ethylene Dichloride

One volume of raw whole egg is mixed with four volumes of ethylene dichloride in a Cherry Burrell homogenizer, and the emulsified mixture is then introduced into a pressure vessel as a fine spray below the level of a boiling body of ethylene dichloride maintained at a temperature of no more than 40° C. and at a pressure of about 215 mm. of mercury.

An azeotrope of solvent and water is removed by distillation until substantially all the water from the raw egg is withdrawn. The temperature of the egg solvent mixture is maintained below about 40° C. throughout the distillation processing. After substantial dehydration, the ethylene dichloride is removed by draining through a screen opening in the vessel and fresh solvent is added to the product which has been dried of water. The mixture is stirred and the solvent is again removed by draining through the opening in the vessel.

A fine spray of water is introduced into the cold vessel and the temperature is maintained at no more than about 40° C. The substantial content of the ethylene dichloride remaining in the dried residue is removed as a mixture of the water and solvent. The resulting product has trace levels of ethylene dichloride intimately contacted with the individual particles to such a degree that the ethylene dichloride content of the product is from about 60 p.p.m. to about 100 p.p.m.

EXAMPLE 2

Preparation of Egg Product by Azeotropic

Distillation with Ethylene Dichloride

The process steps of Example 1 are essentially followed except that the emulsified mixture of raw egg and ethylene dichloride is delivered as a spray through spray jets under pressure into the body of boiling ethylene dichloride at a point just below the surface. The pressure in the closed pressure heating vessel is about 215 mm. of mercury. An azeotrope of solvent and water is removed by distillation until substantially all the water from the raw egg is withdrawn. The temperature of the egg solvent mixture is maintained below about 40° C. throughout the distillation processing. After substantial dehydration, the ethylene dichloride, containing the fat, is removed by draining through a screen opening in the vessel and fresh solvent is added to the water-dried product. The mixture is stirred and the solvent is again removed by draining through the opening in the vessel.

A fine spray of water is introduced into the cold vessel and the temperature is maintained at no more than about 40° C. Substantially all the ethylene dichloride remaining in the dried residue is removed as a mixture of the water and solvent.

EXAMPLE 3

The egg product prepared according to the teachings of Example 1 is analyzed to determine its protein and lipoprotein by the methods described in A.O.A.C. "Methods of Analysis," 10th Ed.

The Food & Drug bacteriological method is employed to determine any Salmonella infection. The cholesterol content is determined by the method described in "Anal. Chem.," Vol 22, page 1210 (1950). The presence of Salmonella infection is studied by the method described in the Bacteriological Analytical Manual, Food and Drug Administration, 1966.

The protein content was found to be about 75 percent by weight and the lipo-protein content about 9 percent by weight. The protein content quantity of egg products prepared by the prior art method of spray drying was found to have a protein quantity of 45 percent or substantially lower than the protein quantity of the egg product of the present invention. The egg product was substantially free of cholesterol as compared to the original cholesterol levels and the cholesterol levels of the prior art spray dried egg products. The egg product of the invention is free of any Salmonella infection.

EXAMPLE 4

Protein Efficiency Ratio of

Egg Product

The egg product prepared by the method of Example 1 is subjected to Derse Assay for 4 weeks and compared with the recognized standard of casein, (milk protein). The casein had a P.E.R. or protein efficiency ratio of 2.80 whereas the egg product of this invention had a P.E.R. or protein efficiency ratio of 4.03.

The improved egg product of this invention permits the product to be provided to the consumer in a packaged form because of its indefinite shelf life which results in a stability heretofor unknown for dried egg products. It is recognized that the prior art egg products prepared by spray drying have limited stability in storage at room temperature.

It will also be appreciated that the substantial removal of cholesterol, up to about 96 percent, makes the product attractive to those many consumers who diligently attempt to avoid cholesterol in their diets.

The elimination of the problem of pathogenic organisms, namely, Salmonella, is a marked improvement because prior art egg products prepared by spray drying require pasteurization to eliminate this problem. This pasteurization step is cumbersome and uneconomical because it is a sensitive procedure. If pasteurization exceeds a predetermined upward temperature level, coagulation of protein occurs which will frustrate attempts to dissolve the powdered egg product in water prior to cooking. If a lower pasteurization level is not attained, then the pathogenic organism is not destroyed. Such an added procedure is never required with the egg product of the present invention because Salmonella infection is entirely eliminated by the presence of the fat organic solvent, particularly a halogenated hydrocarbon solvent.

Not only are the trace levels of ethylene dichloride nontoxic, but the ethylene dichloride tends to become volatilized upon cooking of the egg product. The instant egg product undergoes ready admixture with added water and cooks to a homogenous and good appearance. The improved resistance to insect infestation, imparts additional advantages relative to the feature of storage, since the likelihood of this potential hazard is reduced.

The invention may now be practiced in the various ways which will occur to practitioners, and all such practice is intended to be a part of the present invention provided it comes within the terms of the following claims as given further meaning by the language of the preceding specification.

What is claimed is:

1. The method of producing from eggs dehydrated and defatted food solids of nutritious quality high in protein and highly resistant to deterioration in time, comprising quality high steps of emulsifying raw eggs in an organic fat solvent capable of forming with water an azeotrope having a boiling temperature less than that of the pure solvent and which is nontoxic to humans at levels of below 100 parts per million, spraying the egg emulsion into a body of said organic solvent and simultaneously heating the solvent body under reduced pressure conditions to cause vapors of azeotrope formed by solvent and water from the eggs to boil off from the said body at a temperature of said body of not more than about 100° Fahrenheit and to effect dehydration and defatting by the solvent of the emulsified egg sprayed into said body, removing azeotropic vapor from the boiling solvent body, collecting the residual dehydrated and defatted egg solids and draining solvent from such solids, applying water in small droplets to the collected residual solids to form an azeotrope with the solvent left with the solids after draining and distilling off azeotrope from the residual solids at a temperature elevated but limited to be below about 100° Fahrenheit until the solvent content of such residual solids is reduced below 100 parts per million, and collecting the residual solids thus produced, which are palatable, free of infection with Salmonella, and substantially free of any cholesterol or fat content.

2. The method of claim 1 in which the solvent is ethylene dichloride and in which the application of small droplets of water to the residual solids with the attendant distillation off of azeotrope is continued in time to provide in the resultant residual egg solids an ethylene dichloride constituent ranging between 60 and 100 parts per million.

3. The method of claim 1 including the addition of a nontoxic antioxidant to the heated body of solvent into which the egg emulsion is introduced to effect in conjunction with dehydrating and defatting of the egg particles a full dispersion and intimate contact of the antioxidant with the multitudinous particles of emulsified egg undergoing dehydration and defatting.

4. The method of claim 1 in which the eggs are emulsified in a halogenated hydrocarbon solvent that is one of those of the solvent body and in which the halogenated hydrocarbon solvent content of the residual solids is reduced to 60—100 parts per million.

5. A dehydrated and defatted egg powder,
said powder being substantially free of water,
said powder being substantially free of fat so that the powdered product is stable indefinitely at room temperature,
said powdered product being free of Salmonella infection,
said powdered product being substantially free of cholesterol, and
said product containing 60—100 parts per million of ethylene dichloride thereby exhibiting an improved resistance to insect infestation.